United States Patent [19]
Jennings

[11] Patent Number: 4,928,633
[45] Date of Patent: May 29, 1990

[54] WATER SUPPLY APPARATUS

[76] Inventor: Norman T. Jennings, Mile End Road, Rouse Hill, New South Wales 2153, Australia

[21] Appl. No.: 361,789

[22] Filed: May 30, 1989

Related U.S. Application Data

[63] Continuation of Ser. No. 104,823, Oct. 5, 1987, abandoned.

[51] Int. Cl.$^5$ ............................................. A01K 39/02
[52] U.S. Cl. ..................................... 119/75; 119/72.5
[58] Field of Search ................................ 119/72.5, 75

[56] References Cited

U.S. PATENT DOCUMENTS

| | | | |
|---|---|---|---|
| 1,918,566 | 7/1933 | Sadleir | 119/75 |
| 2,775,227 | 12/1956 | Millies | 119/72.5 |
| 3,724,425 | 4/1973 | Thompson | 119/72.5 |
| 4,284,036 | 8/1981 | Hostetler | 119/72.5 |
| 4,637,345 | 1/1987 | Hostetler | 119/72.5 |
| 4,669,422 | 6/1987 | Stendler, Jr. | 119/72.5 |

*Primary Examiner*—Paul J. Hirsch
*Attorney, Agent, or Firm*—Andrew S. Langsam

[57] ABSTRACT

A water supply for caged birds includes a water outlet actuated by the birds for drinking purposes. A V-shaped channel below the outlet serves to catch spillage adjacent the outlet and the upper marginal edges of the channel form a barrier to one side of the water outlet for the birds to approach the outlet with its neck substantially horizontal or inclined downwardly.

5 Claims, 1 Drawing Sheet

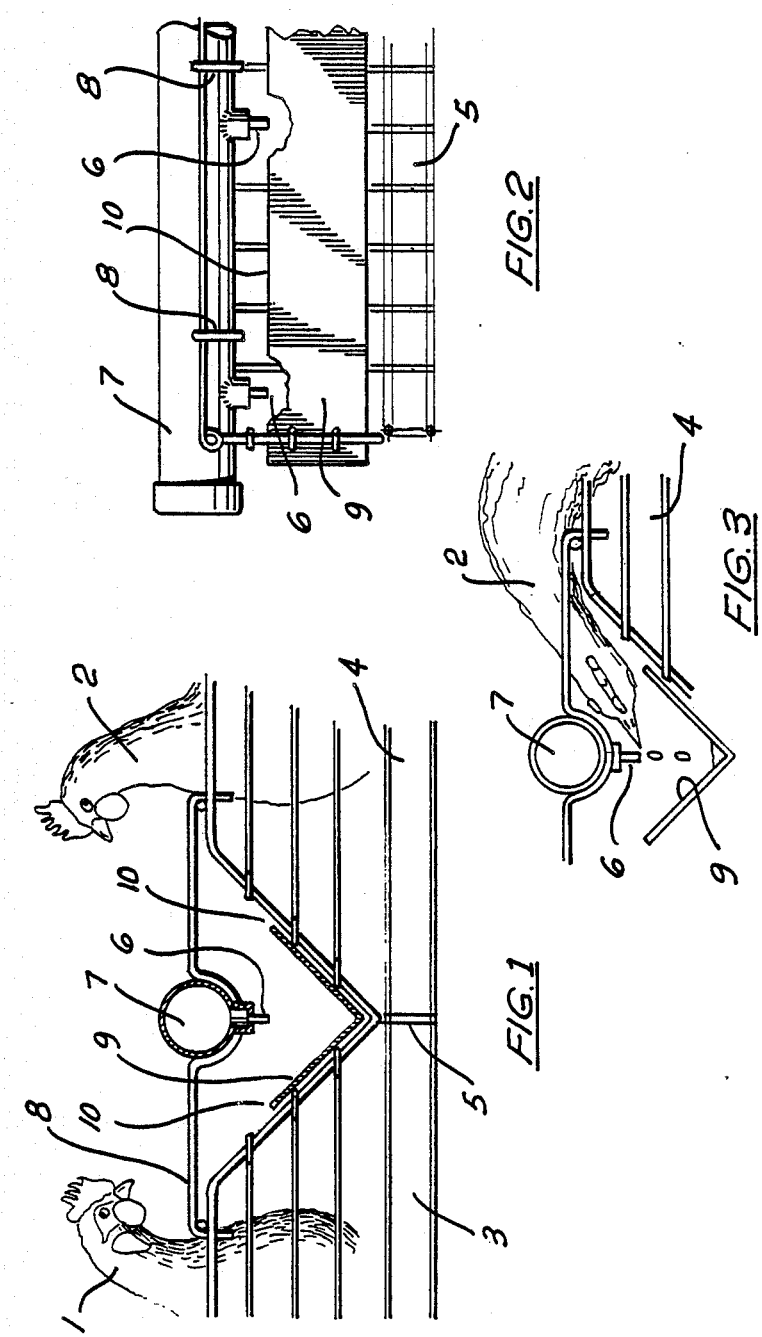

WATER SUPPLY APPARATUS

This is a continuation of co-pending application Ser. No. 07/104,823 filed on Oct. 5, 1987, now abandoned.

1. Background Art

This invention relates to water supply apparatus for caged birds and in particular fowls.

Fowl manure in compressed pelltised form has been found to be a particularly useful fertiliser for both domestic and commercial applications. Most known pelletisation processes require the moisture content of the manure to be in the vicinity of 12%. However, the manure collected from below the open bottomed cages of caged fowls, which is a major source of manure for pelletisation, has a moisture content typically in the range of 75% to 80%. The present invention relates to a water supply apparatus for caged birds which significantly decreases the moisture content of the bird's manure by preventing the water drops from falling onto the manure or "droppings" otherwise dripping down the fowl's neck during drinking.

2. Description of the Prior Art

It has hitherto, therefore been necessary to dry the manure prior to pelletisation. Drying not only adds significantly to production costs but also can be a source of air pollution and potential explosion due to release of gases during drying, particularly in the case of kiln drying.

SUMMARY OF THE INVENTION

This invention proceeds from the realisation that manure accumulating below caged fowls is maintained at its initial moisture content typically around 75% to 80% and prevented from drying by water spilt whilst the birds are drinking. In particular it was recognised that when a bird drinks from a bird actuated water outlet, the arrangement of the outlets is often such that the bird's neck is inclined upwardly. Spilt water therefore runs down the birds neck and drips into manure below. Some known drinking arrangements provide a trough or the like immediately below the water outlet but these catch only water directly dripping from the outlet and not water which runs down the neck of the bird.

It has been found that this spillage is substantially eliminated if a barrier is positioned to the side of the water outlet to force the bird to approach the outlet with its neck substantially horizontal or inclined downwardly. In practice this is achieved by the birds being forced to turn its head to one side to approach the outlet.

It is an object of this invention to provide a water supply apparatus for caged birds which will reduce or substantially eliminate spillage of drinking water into manure below the cage.

Accordingly, this invention consists in a water supply apparatus for caged birds comprising a water outlet actuated by the birds for drinking purposes; trough means positioned below the water outlet to catch spillage adjacent the outlet; and barrier means to one side of the water outlet to force the caged bird to approach the outlet with its back substantially horizontal or inclined downwardly.

By forcing the birds to approach the water outlet with their necks substantially horizontal or inclined downwardly any spilled water tends to drip into the trough means rather than running down the birds neck and dropping into the manure.

For preference, the barrier means are at or above the level of the water outlet although in practice it has been found that as long as the barrier is less than 3.0 to 2.5 cm below the outlet the birds are forced to approach the outlet with their necks sufficiently close to horizontal to achieve the object of the invention.

Also, the preferred embodiment contmplates that the trough means for the water and the physical barrier for the fowl's neck are integrally formed as a unitary channel member. The upper marginal edges of the channel member form the barrier while the lower portion of the channel member is the water trough.

The channel can be of any suitable cross-sectional shape and is preferably inclined to drain spilled water away.

It has been found that manure accumulated below cages equipped with water supply apparatus according to this invention shows at least a 50% reduction in water content over manure accumulated below cages with a conventional water supply.

BRIEF DESCRIPTION OF THE DRAWINGS

One embodiment of this invention will now be described, by way of example only, with reference to the accompanying drawings in which:

FIG. 1 is a part end view of two adjacent fowl cages with a water supply apparatus according to this invention located therebetween;

FIG. 2 is a part side view of the arrangement shown in FIG. 1; and

FIG. 3 is a view similar to FIG. 1 showing a fowl drinking.

DESCRIPTION OF THE PREFERRED EMBODIMENTS

As seen in the drawings fowls 1 and 2 are housed in adjacent cages 3, 4 which respectively taper downwardly to form a common wall 5.

The water supply apparatus comprises a water outlet actuated by the fowls in the form of a drinking nipple 6 of known type fitted to a pressurised water supply pipe 7. The supply pipe 7 is supported by brackets 8. Nipples 6 are positioned at suitable intervals along supply pipe 7. Trough means in the form of a V-shaped trough 9 extend below the nipples 6 to catch spillage from or adjacent the nipple. As best seen from FIG. 3 the upper marginal edge 10 of the trough 9 forms a barrier means at the level of the nipples which force the fowls to approach the nipple with their necks substantially horizontal or inclined downwardly. In this way spilled water drips into trough 9 and does not tend to run down the birds neck. The trough 9 is inclined to drain the spilled water to a suitable discharge pipe or the like.

The V-shaped trough 9 is preferably formed with an included angle of approximately 90° and a distance of greater than 10 cm and most preferably approximately 12.5 cm across the open top. It will be apparent however, that a trough of any suitable cross-sectional shape can be used.

In addition, it is not essential that the trough and barrier be integrally formed. A suitable barrier, such as a rail for example, can be positioned above a shallow trough.

It will also be apparent that this invention is not limited to water outlets of the nippel type. In this regard the invention has been found to be successful when used with other water outlets including those known as watering cups which contain a plate depressed by the bird to actuate a water supply valve.

Tests conducted on manure collected from below cages equipped with water supply apparatus according to this invention have shown at least a 50% reduction in moisture content over manure collected below cates with conventional water supply systems. This reduced moisture content, around 35% to 40% makes it possible to pelletise the manure with only minor drying. In addition the drier condition of the accumulating manure reduces the offensive odour, flies and maggots normally associated with caged birds. Further the drier condition reduces significantly the loss of ammonia and hence further value.

In addition to the reasons advanced above it has been observed that because the barrier makes access to the water outlet more difficult the instance of birds "playing" with water outlets and thereby spilling further water is reduced. It is considered that this can play a significant part in achieving the improvements detailed above.

I claim;

1. A water supply apparatus for caged fowls comprising a water supply channel having a water outlet with nipple means actuable by said fowl to enable said fowl to drink directly from said water outlet;

trough means positioned immediately below said water outlet and extending generally parallel to said water supply channel to catch substantially all water spillage from said water outlet, nipple means and from the beaks and necks of said fowl during drinking;

said trough means being located closely adjacent said water outlet and well above the level of excrement of said caged fowl such that said fowl is prevented from excreting into said trough means; and physical barrier means positioned close to said water oulet and said nipple means to allow said caged fowl to only approach and drink water from said water outlet with their necks substantially horizontal or inclined downwardly toward said trough means so that substantially all spilled water during drinking tends to drip down the necks and beaks of said caged fowl and into said trough means; said water outlet, nipple means and said physical barrier means being at a level with respect to ground bascially vertically aligned with the necks of said fowl when said fowl stands erect.

2. A water supply apparatus according to claim 1, wherein said trough means and said barrier means are formed as a unitary channel member, the upper marginal edge of said channel member forming said barrier means and the lower portion of said channel member forming said trough means.

3. A water supply apparatus according to claim 1 wherein said trough means has a V-shaped cross section.

4. A water supply apparatus according to claim 2 wherein said upper marginal edge is disposed less than about 3.0 cm below said water outlets.

5. A water supply apparatus according to claim 3, wherein said V-shaped cross-section of said trough means has an included angle of approximately 90% and a width across the top from about 10 cm to about 12.5 cm.

* * * * *